(12) United States Patent
Yamada (10) Patent No.: US 7,679,499 B2
(45) Date of Patent: Mar. 16, 2010

(54) WARNING SYSTEM

(75) Inventor: Yasufumi Yamada, Okazaki (JP)

(73) Assignee: DENSO CORPORATION, Kariya (JP)

( * ) Notice: Subject to any disclaimer, the term of this patent is extended or adjusted under 35 U.S.C. 154(b) by 235 days.

(21) Appl. No.: 11/826,840

(22) Filed: Jul. 19, 2007

(65) Prior Publication Data

US 2008/0048850 A1 Feb. 28, 2008

(30) Foreign Application Priority Data

Aug. 24, 2006 (JP) ............................. 2006-227974

(51) Int. Cl.
*B60Q 1/00* (2006.01)
(52) U.S. Cl. ...................... 340/439; 345/173
(58) Field of Classification Search .................. 340/439, 340/173, 352, 438; 345/173
See application file for complete search history.

(56) References Cited

U.S. PATENT DOCUMENTS

| 6,574,538 | B2 | 6/2003 | Sasaki |
| 2007/0053584 | A1 * | 3/2007 | Nagaoka et al. ............. 382/154 |

| 2008/0211779 | A1 * | 9/2008 | Pryor ......................... 345/173 |

FOREIGN PATENT DOCUMENTS

| JP | A-11-120488 | 4/1999 |
| JP | A-2002-116034 | 4/2002 |
| JP | 2002221428 A * | 8/2002 |
| JP | A-2002-221428 | 8/2002 |
| JP | A-2003-306106 | 10/2003 |
| JP | A-2004-009833 | 1/2004 |
| JP | A-2004-325255 | 11/2004 |
| JP | A-2005-241516 | 9/2005 |

* cited by examiner

*Primary Examiner*—Daniel Wu
*Assistant Examiner*—Shirley Lu
(74) *Attorney, Agent, or Firm*—Posz Law Group, PLC (57) ABSTRACT

A warning system warns a driver of a vehicle that a vehicle location in a record of previously detected drive operation that indicates a violation of a safety standard and a current position of the vehicle are determined to be within a predetermined distance from each other based on repeated detections of a current vehicle position by a detector and a detection of the drive operation that indicates the violation of the safety standard transmitted through an interface from a drive recorder. In this manner, the warning system for warning the driver lightens a process load of a unit that performs a position detection process and a unit that performs a record keeping process.

12 Claims, 4 Drawing Sheets

WARNING SYSTEM

CROSS REFERENCE TO RELATED APPLICATION

This application is based on and claims the benefit of priority of Japanese Patent Application No. 2006-227974 filed on Aug. 24, 2006, the disclosure of which is incorporated herein by reference.

FIELD OF THE DISCLOSURE

The present disclosure generally relates to a warning system for use in a vehicle.

BACKGROUND INFORMATION

In recent years, a technique to warn a driver of a vehicle not to repeat a dangerous driving operation at a previously recorded point is disclosed, for example, in Japanese patent document JP-A-2002-221428. The disclosure of the patent document has a warning scheme that the driver is warned by a vehicle navigation apparatus when the vehicle approaches a recorded point of the dangerous driving operation based on a record of the dangerous driving operation of the driver, if any such operation is performed, in association with location information based on an acceleration of the vehicle or the like in a previous time of travel of a certain location which is determined by the navigation apparatus.

The technique disclosed in the above document uses only one control circuit for following processes that includes detecting the dangerous driving operation, identifying the location of the dangerous driving operation, recording the location of the dangerous driving operation, determining an approach of the vehicle toward the recorded location and providing the warning.

However, processes of detecting the dangerous driving operation, identifying the location of the dangerous driving operation, recording the location of the dangerous driving operation, determining an approach of the vehicle toward the recorded location and providing the warning by only one control circuit puts a heavy process load on the control circuit.

SUMMARY OF THE DISCLOSURE

In view of the above and other problems, the present disclosure provides a process load lightening scheme for a warning technique that is use in a vehicle for warning a driver when the vehicle approaches a previously recorded position of unsafe driving operation of the driver based on a record of a previously detected unsafe driving operation.

A warning system for use in a vehicle in the present disclosure includes a detector that detects a driving operation that indicates a violation of a safety standard and outputs a detection signal that indicates the detection of the driving operation exceeding the safety standard, an interface unit that is connected to the detector and an acquisition unit that repeatedly identifies a current position of the vehicle, acquires the detection signal output from the detector through the interface unit, and records location information (i.e., unsafe location information hereinafter) of the vehicle at a time of the driving operation that indicates the violation of the safety standard based on an acquisition of the detection signal. The acquisition unit provides a warning for a user based on a predetermined degree of closeness of the identified current position of the vehicle to a position indicated by a former record of the unsafe location information.

In this manner, the detector and the acquisition unit are connected with each other through the interface unit for respectively serving as an unsafe driving detector function and as an unsafe driving position recorder function and an unsafe position approach warning provider function. In this manner, the technique for detecting and recording the unsafe driving of the driver and for warning a closeness of the vehicle to the detected position is provided with a reduced process load on the apparatus that provides the record of the detected position and the warning.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present disclosure are described with reference to the accompanying drawings.

Figure 1:
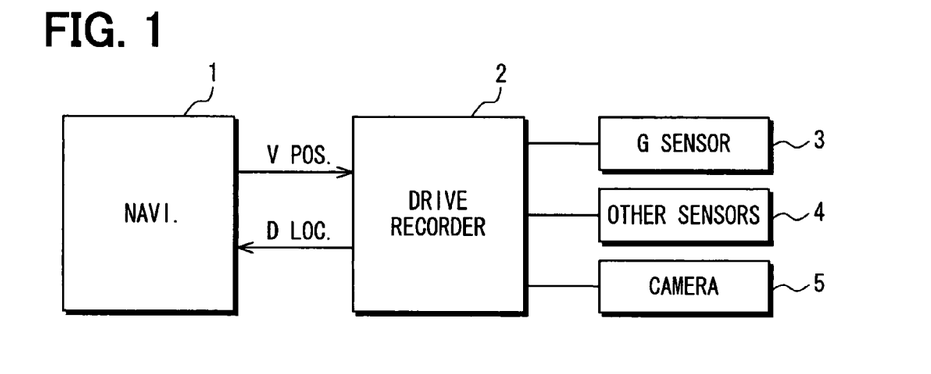
FIG. 1 shows a block diagram of a warning system in an embodiment of the present disclosure.

FIG. 1 shows a block diagram of a warning system in an embodiment of the present disclosure. The warning system is disposed on a vehicle, and includes a vehicle navigation apparatus 1, a drive recorder 2, an acceleration sensor (designated as a G sensor in the figure) 3, various sensors 4 and a surveillance camera 5.

The navigation apparatus 1 on vehicle is a device guiding a course to an inputted destination. The drive recorder 2 is an equipment that records a captured image at the time of unsafe driving when the unsafe driving of a vehicle is detected. The acceleration sensor 3 is an equipment outputting to the drive recorder 2 a signal of each detection result which is derived from periodical detection of acceleration of the vehicle in a front-rear, up-down, and right-left direction at a predetermined interval .(e.g., at every 10 milliseconds). The various sensors 4 are a group of sensors such as a yaw rate sensor, a speed sensor and the like for supplementarily detecting the unsafe driving of a vehicle, and the various sensors 4 outputs various detection signal to the drive recorder 2. The surveillance camera 5 is an equipment that periodically captures vehicle circumference such as a front of the vehicle (e.g. at every second or at every 0.1 seconds), and outputs a signal of capture result to the drive recorder 2.

The navigation apparatus 1 on the vehicle identifies the position of the vehicle regularly and repeatedly as is explained in detail in the following, and the drive recorder 2 regularly acquires information of the position of the vehicle, and the recorder 2 further outputs the latest vehicle position information to the navigation apparatus 1 on the vehicle as the unsafe position data when the unsafe driving of the vehicle is detected. The navigation apparatus 1 on the vehicle outputs a warning for the driver when subject vehicle approximates to the position that is indicated by the unsafe position data.

Figure 2:
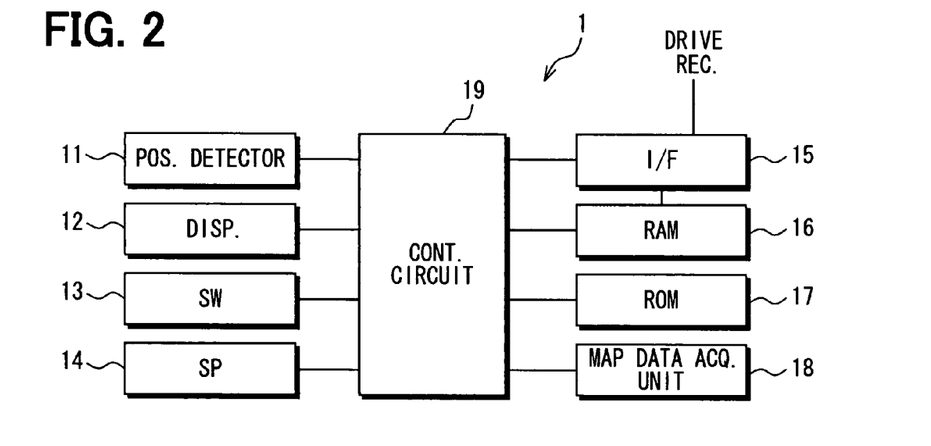
FIG. 2 shows a block diagram of a navigation system for use in a vehicle.

A hardware configuration of the navigation apparatus 1 on the vehicle is shown in the block diagram in FIG. 2.

Navigation apparatus 1 on the vehicle has a position sensor 11, an image display unit 12, a group of operation switches 13, a speaker 14, an interface 15, a RAM 16, a ROM 17, map data acquisition unit 18, and a control circuit 19.

A position detector 11 has sensors such as a geomagnetic sensor, a gyroscope, a speed sensor, a global positioning system (GPS) receiver, and the like, and outputs information to the control circuit 19. The information detected by those sensors in the detector 11 is derived from respective characteristics of the sensors, and is used to identify the current position and direction of the vehicle.

The image display unit 12 displays an image based on video signal output from control circuit 19 in a user. Operation switches 13 consist of input apparatus such as a mechanical switch, a touch panel, and the like, and outputs to the control circuit 19 a signal based on an operation of the mechanical switch, the touch panel by the user.

An interface 15 is a circuit for transmitting and interchange of a signal between the control circuit 19 and the drive recorder 2. Thus, the interface 15 is connected to both of the control circuit 19 and the drive recorder 2. The interface 15 enables an execution of the read/write processes to/from the RAM 16. More practically, the interface 15 may be implemented by using a microcomputer of well known type which includes the CPU, the RAM, the ROM, and the I/O.

A map data acquisition unit 18 consists of a nonvolatile storage medium such as hard disk drives or the like and a unit which reads out and writes data from/to the storage medium, and the acquisition unit 18 stores a program which the control circuit 19 executes, map data for route guidance.

The control circuit (equivalent to a computer) 19 executes a program retrieved from the ROM 17 and the map data acquisition unit 18 in a time sharing method for operating the navigation apparatus 1. The execution of the program is performed by reading information from the RAM 16, the ROM 17 the map data acquisition unit 18, and by writing information to the RAM 16 and the map data acquisition unit 18. The execution of the program further performs signal exchange with the position detector 11, the image display unit 12, operation switches 13, and the speaker 14.

The control circuit 19 practically performs by executing the program processes such as a current position identification process, a navigation route calculation process, a route guidance process and the like.

The current position identification process is a process for identifying a current position and direction of the vehicle by the use of technique such as a well-known map matching and the like based on a signal from the position detector 11. The navigation route calculation process is a process for calculating optimal navigation route from the current position to the destination concerned based on an input of the destination from the user through the operation switches 13. The route guidance process is a process that reads map data from the map data acquisition unit 18, outputs an image which superposes a calculated navigation route, the destination, stop-by places a current position and the like on the map drawn by the retrieved map data to the image display unit 12, and outputs a guidance voice signal to the speaker 14 for instructing a right turn, a left turn or the like on demand when the subject vehicle approaches a proximity of an intersection where the route guidance is going to be provided.

Figure 3:
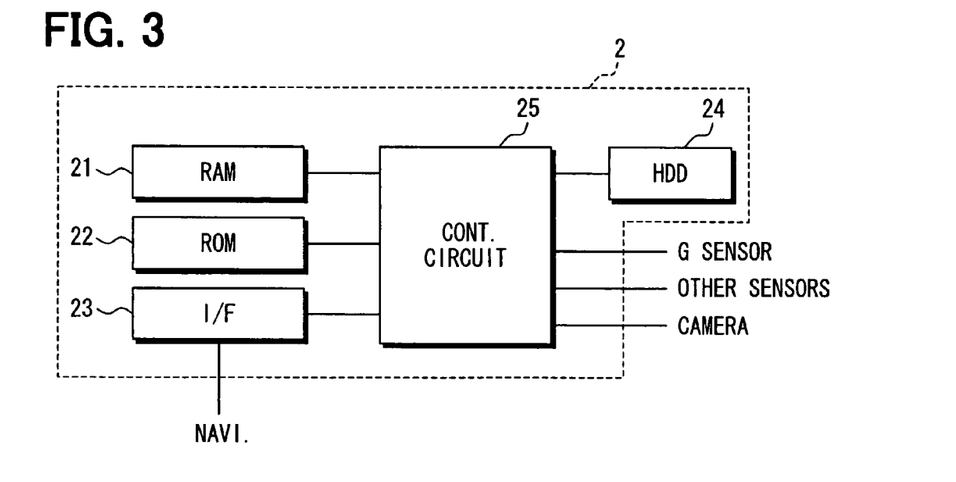
FIG. 3 shows a block diagram of a drive recorder.

A hardware configuration of the drive recorder 2 is shown in FIG. 3 in a form of a block diagram. The drive recorder 2 has a random access memory (RAM) 21, a read only memory (ROM) 22, an interface 23, a hard disk drive 24 and the control circuit 25. The drive recorder 2 has a housing to protect these devices 21-25 therein. A material and structure of the housing have robustness that prevents breakage of the internal equipment even if an accident of the vehicle breaks a body of the vehicle.

The hard disk drive 24 is a memory medium for storing a program to be executed by the control circuit 25, data of the moving image captured by the surveillance camera 5, that is, captured data, and the like.

The interface 23 is a circuit that mediates signal exchange between the control circuit 25 and the navigation apparatus 1 by being connected to the interface 15 of the navigation apparatus 1 and the control circuit 25.

The control circuit (equivalent to a computer) 25 executes a program retrieved from the ROM 22 and the hard disk drive 24 for operating the drive recorder 2, and, in the case of such execution, the control circuit 25 receives a signal from the acceleration sensor 3, the various sensors 4, and the surveillance camera 5, reads information from the RAM 21, the ROM 22, and the hard disk drive 24, and writes information to the RAM 21 and the hard disk drive 24.

Figure 4:
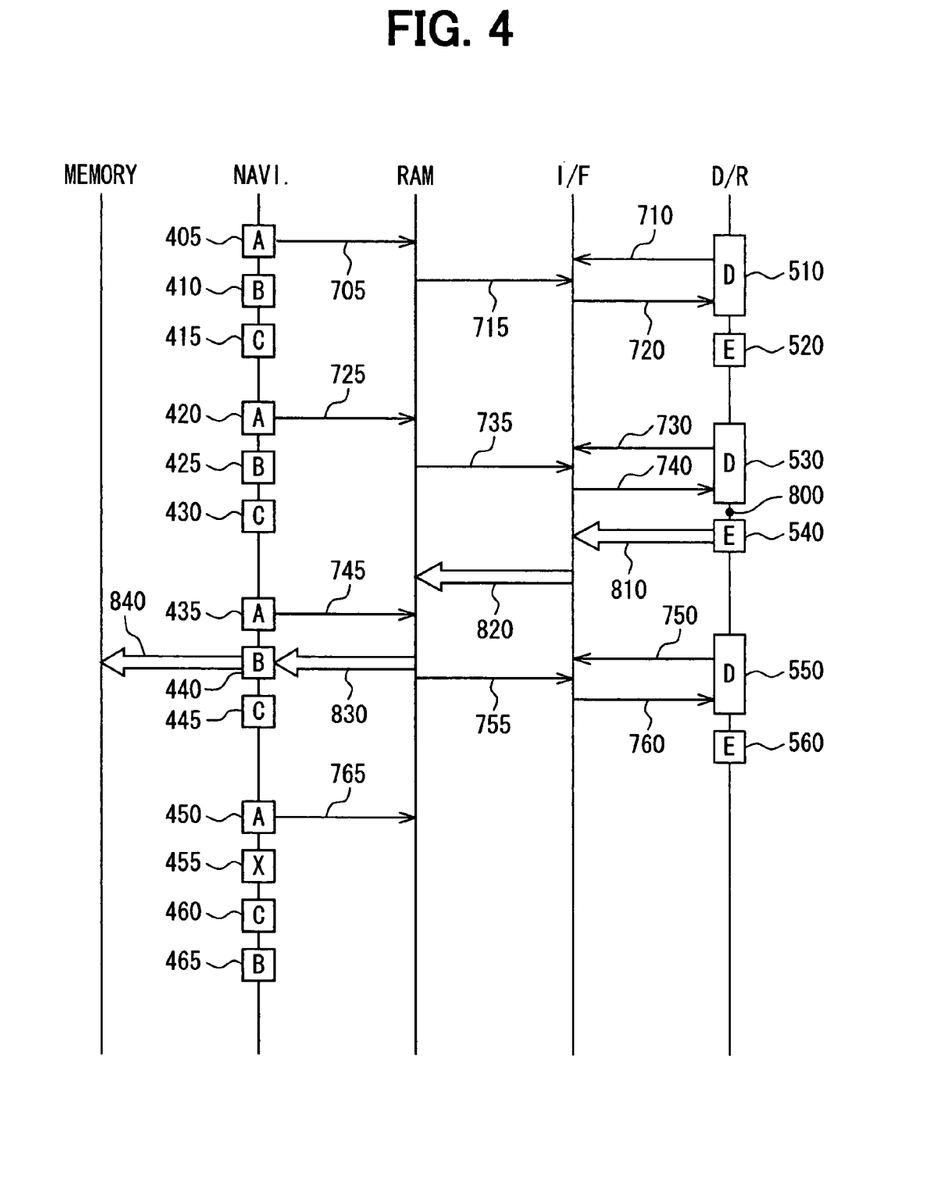
FIG. 4 shows a time chart of execution of processes and exchange of signals in the warning system.

The operation of the warning system 1 having the hardware configuration described above is explained in the following. An example of a process in the warning system 1 and a timing of signal output are shown in FIG. 4. In this case, in FIG. 4, the storage medium is equivalent to a hard disk of the map data acquisition unit 18, and a navigation apparatus is an equivalent to the control circuit 19 of the navigation apparatus 1 on the vehicle, and the RAM is an equivalent to the RAM 16 of navigation apparatus 1 on the vehicle, and the interface is an equivalent to the interface 15 of the navigation apparatus 1 on the vehicle, and the drive recorder is an equivalent to the control circuit 25 of drive recorder 2.

The control circuit 19 of the navigation apparatus 1 on the vehicle performs an A schedule process, a B schedule process, and a C schedule process respectively conforming to a predetermined schedule scheme as shown in FIG. 4. More practically, the control circuit 19 executes the A schedule process, the B schedule process, and the C schedule process respectively in this order regularly when an interruption process and other processes are not executed.

Figure 5:
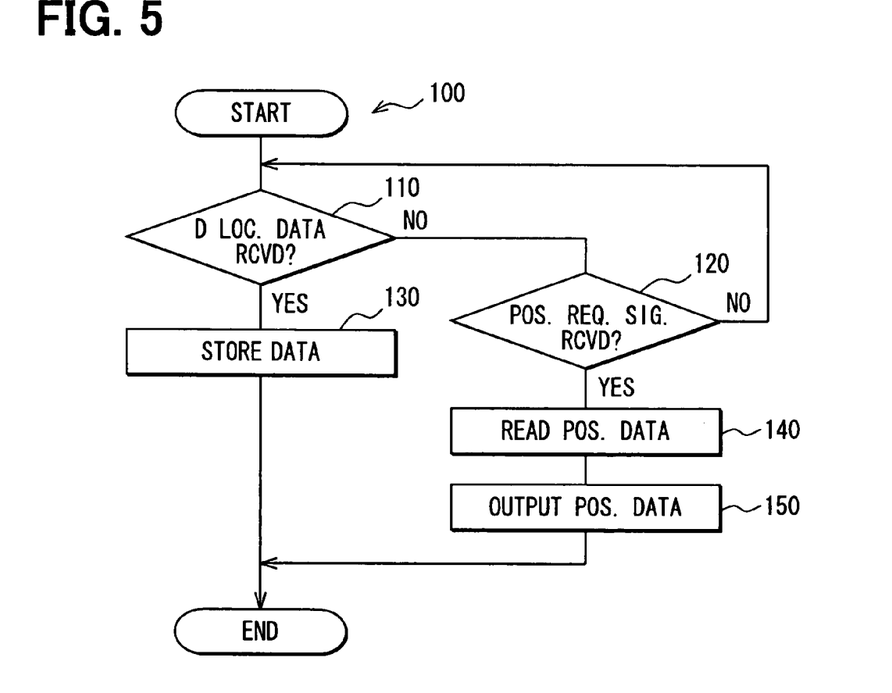
FIG. 5 shows a flowchart of a program performed by an interface unit.

The interface 15 executes a program 100 in FIG. 5 regularly in a repeated manner. The detail of the processing by the program 100 is described later.

The control circuit 25 of the drive recorder 2 performs a D schedule process and an E schedule process respectively conforming to a predetermined schedule. More practically, the control circuit 25 executes the D schedule process and the E schedule process regularly in this order (for example, at the same cycle as a capture cycle of the surveillance camera 5). In this case, the time interval from an end of the D schedule process to a start of the E schedule process may be a standard time interval (e.g., 1/100th or the like of the execution cycle of the schedule process D, E).

In the A schedule process carried out at a timing 405, 420, 435, or 450, the control circuit 19 performs the current position identification process, and stores data of a current position of the subject vehicle identified thereby in a region for the positional information in the RAM16 (refer to signals 705, 725, 745,765).

Further, in the D schedule process at a timing 510, 530, or 550, the control circuit 25 outputs a position request signal to the interface 15 through the interface 23 (refer to a signal 710, 730, or 750), and then waits for a reception of position data from the interface 15 through the interface 23 in response for the output of the request.

Furthermore, the interface 15 waits for a reception of the unsafe position data to be mentioned later in an execution of the program 100 (refer to step 110), or the position request signal described above (refer to step 120). Then, when the interface 15 receives the position request signal, the interface 15 reads latest current position data that is stored in the region of the position information in the RAM 16 (refer to step 140, and a signal 715, 735, or 755). Then, the retrieved data is output to the drive recorder 2 as the position data (refer to a signal 720, 740, or 760).

Then, when the control circuit 25 of the drive recorder 2 receives the position data in the D schedule process mentioned above, the position data is recorded in the RAM 21 or a register in the control circuit 25, and the D schedule process concludes itself.

Figure 6:
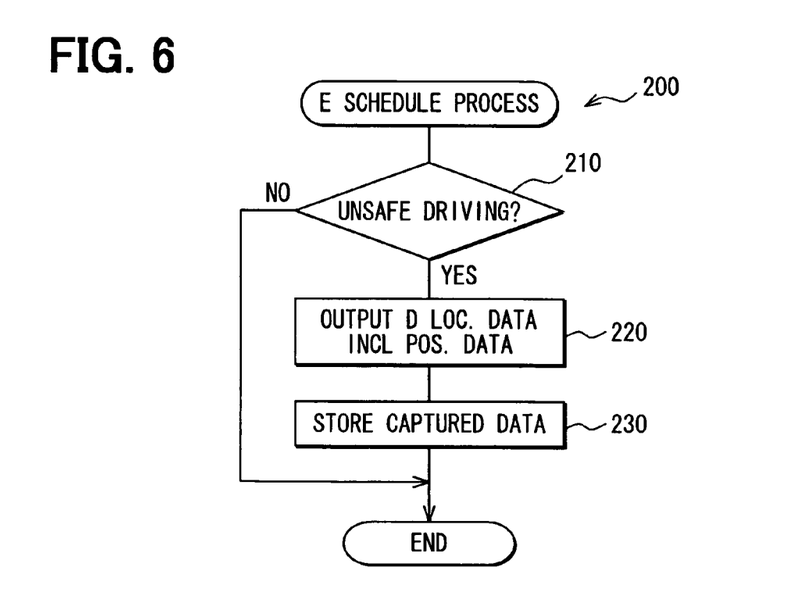
FIG. 6 shows a flowchart of a program performed by a control circuit in the driver recorder.

When the D schedule process is concluded, the control circuit 25 initiates the E schedule process successively. The control circuit 25 executes the program 200 for the E schedule process, and during the execution of the program 200 as shown in FIG. 6, the control circuit 25 outputs the unsafe position data including the position data to interface 15 successively when the unsafe driving is detected (refer to step 220). Further, the control circuit 25 records the image data to the hard disk drive 24 successively (refer to step 230), and then the E schedule process is concluded. The E schedule process is concluded immediately when the unsafe driving is not detected (refer to step 210).

The determination whether the unsafe driving has occurred relies basically on the signal from the acceleration sensor 3. More practically, the unsafe driving is determined to have occurred when a comparison of an acceleration threshold value in the hard disk drive 24 and an actual acceleration value in correspondence to a latest output signal from the acceleration sensor 3 determines that the latter value is greater than the former value. The unsafe driving is not determined to have occurred otherwise.

The position data to be included in the unsafe position data is the data that is recorded in the RAM 21 in an immediately preceding D schedule process.

The image data to be recorded to the hard disk drive 24 is the data that is recorded during a period of the time that includes the time of the unsafe driving. For this purpose, the control circuit 25 retains the image data acquired from the surveillance camera 5 in a past predetermined period in the RAM 21.

Now, the unsafe driving that took place at a timing 800 and a period afterward (e.g., for a period of one second) as shown in FIG. 4 is considered for example. In this case, in the E schedule process at the timing 540, the control circuit 25 detects an occurrence of the unsafe driving, and outputs the unsafe position data including the positional information acquired at the timing 530 (refer to a signal 810).

Further, the interface 15 records received unsafe position data in the region of the unsafe position data of the RAM 21 (refer to step 130, a signal 820) when the unsafe position data is determined to be received in the execution of the program 100 (refer to step 110).

Figure 7:
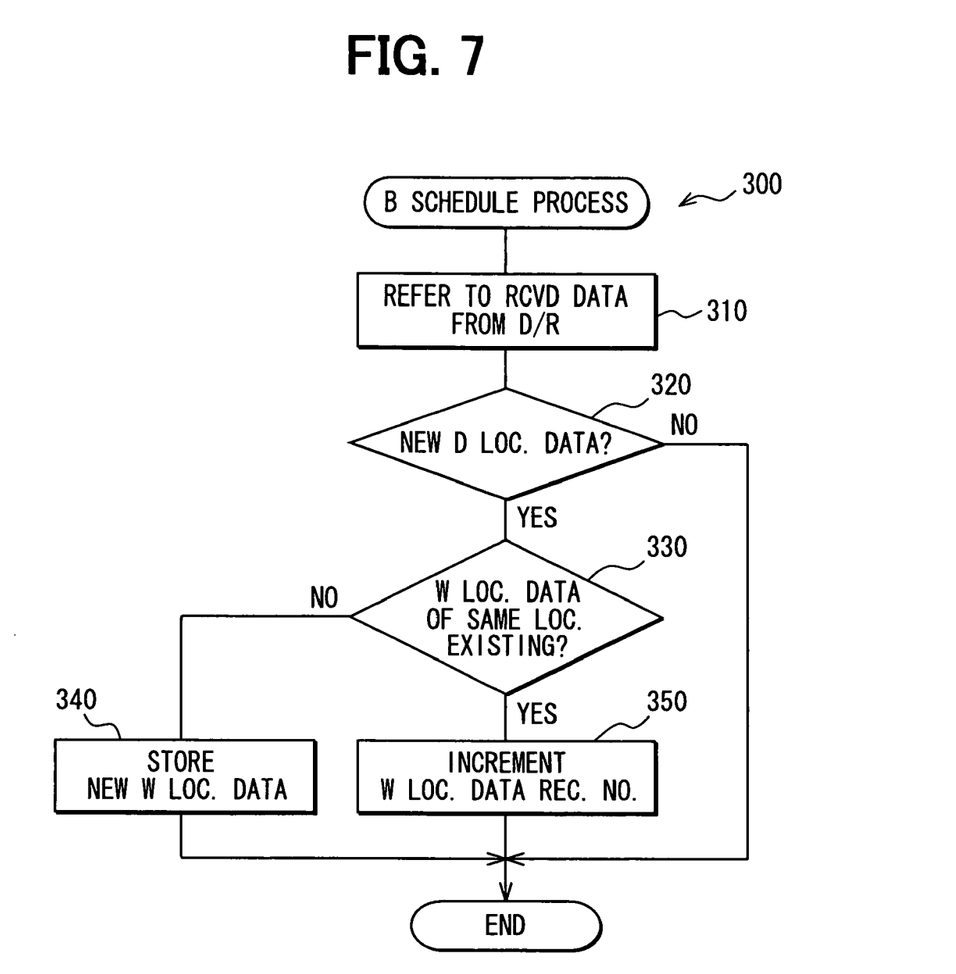
FIG. 7 shows a flowchart of a program performed by a control circuit in the navigation system.

In addition, the control circuit 19 executes the program 300 to perform the B schedule process carried out at a timing 410,425, 440, or 465 as shown in FIG. 7. In the execution of the program 300, the content of the region for the unsafe position data in the RAM 21 is read out for referring to the receive data from the drive recorder 2 (refer to step 310). Then, the control circuit 19 determines whether there is new unsafe position data based on a determination whether the retrieved content is different from the content of the previous retrieval is determined (that is, whether the retrieved content is new) (refer to step 320). When there is not a new unsafe position, the B schedule process is concluded.

The process of step 310 reads the region for the unsafe position data at a timing 440 in FIG. 4 (refer to a signal 830), and determines whether there is a new unsafe position data in step 320 based on the content of the region. When the new unsafe position is determined to be existing, the process of step 330 determines whether there is any matching data by comparing the position data in the unsafe position data (a new position data hereinafter) with all of warning position data in the hard disk of the map data acquisition unit 18 (past position data hereinafter). That is, the process in step 330 determines whether the there is a matching pair of the new position data and the past position data.

Two pieces of the position data are determined to represent an identical position when the difference of the distance represented by the two pieces of data is within a predetermined amount (e.g., 10 meters).

When there is no past position data that represent the position of the new position data, a new warning position data that includes the position of the new position data and a number data of one (equivalent to an example of the unsafe position data) is stored on the hard disk of the map data acquisition unit 18 (refer to step 340 and signal 840), and then the B schedule process is concluded.

When at least one of the past position data matches the position of the new position data, the number data that is included in the matching past position data is incremented by one (refer to step 350 and signal 840), and then the B schedule is concluded.

As described above, the navigation apparatus 1 determines the current vehicle position, the unsafe position data is output to the navigation apparatus 1 upon detecting the unsafe driving, and the position of the unsafe driving is stored in the memory medium (i.e., the hard disk) with the number of the reception of respective unsafe position.

The control circuit 19 determines whether the vehicle is approaching a position of possible unsafe driving in the C schedule process at timing 415, 430, 445, or 460 based on the latest current position derived from the A schedule process. When the vehicle is determined to be approaching the position of possible unsafe driving, the warning image and voice are output from the speaker 14 and the image display unit 12. When the vehicle is not approaching the position of possible unsafe driving, the C schedule process is concluded.

In this case, the position of the possible unsafe driving is the warning position data that has the number data of predetermined value or more in the hard disk of the map data acquisition unit 18. The warning for the user in the above-described manner proactively prevents the unsafe driving by improving user's morale of safe driving.

The execution of the B schedule process at timing 460 and the execution of the C schedule process at timing 465 are behind a scheduled execution timing. This is because of the execution of the process X such as, for example, a user input reception process that has a higher execution priority by the control circuit 19. In this case, the execution of the B schedule process is started when the control circuit 19 is idling after finishing execution of the process X, the C schedule process and the like.

The position of the warning data provided or updated by the B schedule process is usually reached by the vehicle after a time interval that is much greater in comparison to the process time of the process in FIG. 4. Therefore, the priority of the B schedule process may be lower than other processes.

On the other hand, the position of the unsafe driving is accurately identified by decreasing the time difference between the unsafe driving and the current position identification timing. Thus, the priority of the A schedule process may be higher than other processes. Further, the D schedule process and the E schedule process in the G sensor 3 may be in synchronization in addition to a short interval therebetween.

In this manner, the process load for a unit that records the detected position and outputs a warning is decreased in the warning system of the present disclosure. Thus, the unsafe driving detection function originally devised in the drive recorder 2 contributes to the reduction of the process load of the navigation apparatus 1 for use in a vehicle.

In addition, by including the position information in the unsafe driving detection signal from the drive recorder 2 to the navigation apparatus 1, the process load on the navigation apparatus 1 side is further decreased.

Furthermore, as the position of the unsafe driving is derived from the navigation apparatus 1 through the interface 15 at the time of the unsafe driving, the process load on the drive recorder 2 side is further decreased by omitting the process for associating the time of the unsafe driving with the current position. The configuration of the drive recorder 2 is further simplified by omitting the position sensor therefrom.

Furthermore, the interface 15 serves as an expediter of transmission of the position information from the navigation apparatus 1 to the drive recorder 2, thereby further decreasing the process load of the navigation apparatus 1 even when the apparatus 1 is involved in other processes. In other words, the drive recorder 2 is enabled to always receive an accurate current position of the vehicle with a reduced process load without delay.

Furthermore, the unsafe driving may be detected in synchronization with the position detection by the drive recorder 2. In this manner, the accuracy of the position of the unsafe driving is improved.

Furthermore, the scope of warning positions is narrowed down to the positions of higher necessity by counting the number of records at each of the recorded positions and by employing a closeness criterion of the position to the current position.

Furthermore, the time sharing method of the navigation apparatus 1 as well as the scheduling of the position recording process to be executed after other processes prevents the position recording process from affecting other processes.

Although the present invention has been fully described in connection with the preferred embodiment thereof with reference to the accompanying drawings, it is to be noted that various changes and modifications will become apparent to those skilled in the art.

For example, the control circuit 25 of the drive recorder 2 may output to the navigation apparatus 1 the unsafe position data that includes captured image data being captured at an around the time of the unsafe driving. Further, the navigation apparatus 1 may stored the captured image data in the map data acquisition unit 18 for displaying it on the display unit 12 when the vehicle approaches the position that is indicated by one of the unsafe position data. In this manner, the captured image at the time of the previous unsafe driving is provided for the driver for re-confirmation, thereby enabling the driver's cautiousness to be raised for encouraging a safe driving.

Further, the navigation apparatus 1 and the driver recorder 2 housed in the separate boxes may be disposed in a different manner. That is, for example, the function of the navigation apparatus 1 and the driver recorder 2 may be respectively implemented by a first control circuit and a second control circuit to be housed in one box. In this case, the second control circuit serves as a detector, the first control circuit serves as an acquisition unit, and a bus circuit for interconnecting those circuit serves as an interface unit.

Furthermore, the control circuit 25 of the driver recorder 2 may output a position request signal to the interface 15 for acquiring the current position from the navigation apparatus 1 only when the unsafe driving is detected.

Furthermore, the drive recorder 2 may not acquire the current position information from the navigation apparatus 1. For example, the drive recorder 2 may have a GPS receiver besides the GPS receiver in the position detector 11 for detecting the current position by itself based on the signal from the built-in GPS receiver. In this case, the interface 15 may output the signal from the drive recorder 2 to the control circuit 19 after converting it simply for recognition by the control circuit 19, and may output the signal from the control circuit 19 to the drive recorder 2 by simply converting it in a predetermined manner.

Furthermore, the drive recorder 2 may not acquire the current position information. In this case, the drive recorder 2 only outputs a notification signal of the unsafe driving to the interface 15 when the unsafe driving is detected. Then, the interface 15 may store the received notification signal in the RAM 16. Then, the control circuit 19 of the navigation apparatus 1 may detect the current position in, for example, the repeated execution of the A schedule process and may store the current position in the RAM 16 as the vehicle position at the time of the unsafe driving based on a new record of the notification signal in the RAM 16. The time gap between the time of detection of the current position and the time of notification signal reception of the above-described process scheme does not become greater than the interval of the current position detection process in the control circuit 19.

Furthermore, the memory medium for recoding the unsafe position data that is received by the navigation apparatus 1 from the drive recorder 2 may not necessarily be the hard disk 18 of the map data acquisition unit 18. For example, the unsafe position data may be recorded in any memory medium in the navigation apparatus 1 when other type of memory medium such as a flash memory, an EEPROM, a backup RAM or the like that retains its contents even at a vehicle main power turn-off period is available.

Furthermore, the drive recorder 2 may output the unsafe position data to the navigation apparatus 1 when the acceleration detected by the acceleration sensor 3 is greater than a first acceleration threshold, and may store the captured image data on the hard disk drive 24 when the acceleration detected by the acceleration sensor 3 is greater than a second acceleration threshold based on the first and second acceleration threshold stored in the hard disk drive 24. In this case, the value of the second acceleration threshold may be greater than the value of the first acceleration threshold.

Furthermore, the control circuit 19 of the navigation apparatus 1 may receive a signal from operation switches 13 based on an input operation for specifying the number of warnings and the acceleration threshold. In this case, the control circuit 19 may use the inputted number of warnings for controlling the number of warnings in the C schedule process, and may output the inputted acceleration threshold to the drive recorder 2 through the interface 15. In addition, the control circuit 25 of the drive recorder 2 may use the acceleration threshold received from the navigation apparatus 1 as the acceleration threshold used in step 310 of the program 300. In this manner, the user can control the operation of the navigation apparatus 1 and the drive recorder 2 through the navigation apparatus 1.

Furthermore, the drive recorder 2 may provide a notification of the execution timing of the unsafe condition detection for the navigation apparatus 1, and the navigation apparatus 1 may record the current position information in the RAM 16 in synchronization with the execution timing based on the notification of the execution timing. In this case, the navigation apparatus 1 may record, the current position information at, for example, an immediately preceding moment of the execution timing.

Furthermore, the detector may be different from the drive recorder 2. That is, any device may be used as the detector as long as it detects the unsafe driving of the vehicle that violates a safety standard and outputs the detection signal of the unsafe driving.

Furthermore, the acquisition unit may be different from the navigation apparatus. That is, any device may be used as the acquisition unit as long as it detects the current position of the vehicle through the interface unit, acquires the detection signal from the detector through the interface unit, records the position information of the vehicle at the time of the unsafe driving based on the acquisition of the detection signal, and warns the user when the detected current position is close to the position in the recorded position information.

Such changes and modifications are to be understood as being within the scope of the present invention as defined by the appended claims.

What is claimed is:

1. A warning system for use in a vehicle comprising:
   a detector that detects, as unsafe driving, a driving operation exceeding a safety standard and outputs a detection signal that indicates the detection of the unsafe driving;
   an interface unit that is connected to the detector; and
   an acquisition unit, in connection to the interface unit, that repeatedly identifies a current position of the vehicle, acquires the detection signal output from the detector through the interface unit, and records as unsafe location information, position information of the vehicle at a time of the unsafe driving based on an acquisition of the detection signal, wherein
      the detector acquires the current position identified by the acquisition unit through the interface unit,
      the detector outputs the detection signal including the current position as position information of the vehicle at the time when the unsafe driving is detected,
      the acquisition unit acquires and records the position information output by the detector through the interface unit as the unsafe location information,
      the acquisition unit provides a warning for a user based on a predetermined degree of closeness of any identified current position of the vehicle to any position information previously recorded as unsafe location information, and
      the acquisition unit prioritizes the identification of the current position of the vehicle higher than other processes including the recording of the unsafe location information.

2. The warning system of claim 1, wherein the acquisition unit records information of the identified current position on a memory medium,
   the detector outputs a request signal to the interface unit for acquiring the information of the current position, and
   the interface unit retrieves the information of the current position from the memory medium and outputs the retrieved information to the detector based on a reception of the request signal from the detector.

3. The warning system of claim 1, wherein the detector repeatedly acquires the information of the current position identified by the acquisition unit through the interface unit,
   the detector repeatedly determines whether the unsafe driving is performed in synchronization with an acquisition of the information of the current position, and
   the detector outputs the information of the current position that is acquired in synchronization with the determination of a performance of the unsafe driving operation when the performance of the unsafe driving is positively determined.

4. The warning system of claim 1, wherein
   the detector records on the memory medium an image from a camera that captures surroundings of the vehicle at a time of a detection of an unsafe driving.

5. The warning system of claim 4, wherein
   the detector outputs the image from the camera that captures surroundings of the vehicle at a time of a detection of the unsafe driving together with the unsafe location information,
   the acquisition unit receives and records the image from the detector through the interface unit, and
   the acquisition unit displays the image on an image display unit for warning the user based on a predetermined degree of closeness of the current position to a former record of the unsafe location information.

6. The warning system of claim 1, wherein
   the acquisition unit warns the user based on a predetermined degree of closeness of the current position to the position indicated by the former record of the unsafe location information and based on the acquisition of at least a predetermined number of records of the position information indicative of the same position as the unsafe location information.

7. The warning system of claim 1, wherein
   the acquisition unit performs plural kinds of processes by a time-sharing method, and
   the record of the unsafe location information is performed after completion of other processes.

8. The warning system of claim 1, wherein
   the acquisition unit is a navigation system that displays a route to a destination with a map on an image display unit.

9. The warning system of claim 1, wherein
   the detector receives through the interface the identified current position of the vehicle;
   the detector stores the identified current position of the vehicle;
   the detector determines the unsafe location information based on the identified current position of the vehicle stored in the detector and the detection of unsafe driving; and
   the detector outputs the unsafe location information to the acquisition unit.

10. The warning system of claim 9, wherein
    the acquisition unit compares the unsafe location information with records of previously stored unsafe location information;
    the acquisition unit determines whether the unsafe location information matches any records of previously stored unsafe location information based on the comparison;
    when the acquisition unit determines that unsafe location information does match any records of previously stored unsafe location information, the acquisition unit increments a number value associated with a record of the previously stored unsafe location information that is associated with the identified current position; and when the acquisition unit determines that unsafe location information does not match any records of previously stored unsafe location information, the acquisition unit stores a record of the unsafe location information and increments a number value associated with the record of the unsafe location information to one.

11. The warning system of claim 10, wherein the acquisition unit warns the user based on a predetermined degree of closeness of the current position to the former record of the unsafe location information when a number value associated with the former record of the unsafe location information is above a predetermined valued.

12. A warning system for providing a warning in a vehicle comprising:

a detector for detecting an unsafe driving of the vehicle;

an acquisition unit for performing an identification process of a vehicle position and a recording process of an identified vehicle position as unsafe location information at a time of detection of the unsafe driving of the vehicle; and an interface unit for information exchange between the detector and the acquisition unit, wherein vehicle positions identified by the identification process are repeatedly output to the detector through the interface unit;

the detector acquires the vehicle positions identified by the identification process through the interface unit;

the detector unit outputs a detection signal including the identified vehicle position as the unsafe location information when the detector detects the unsafe driving;

the acquisition unit acquires and records the identified vehicle position output by the detector unit as the unsafe location information;

the acquisition unit further provides a warning to vehicle driver based on a predetermined degree of closeness of any vehicle position identified in the identification process to any identified vehicle position previously stored as unsafe location information; and the identification process of the vehicle position is prioritized higher than the recording process of the vehicle position in the acquisition unit.

* * * * *